United States Patent

Chen et al.

[11] Patent Number: 5,916,677
[45] Date of Patent: Jun. 29, 1999

[54] PROCESS FOR PRODUCING POLYESTER FIBER HAVING IMPROVED DYEABILITY, ELONGATION AND STRENGTH, AND POLYESTER FIBER THEREFROM

[75] Inventors: Shien Chang Chen, Taipei; Fu Shen Lin, Kaohsiung; June-Yen Chou, Kaohsiung; Hsing Yun Wang, Kaohsiung; Mao Song Lee, Hsin-Chu; Mei-Sui Chen, Hsinchu; Yann Jyh Huang; Hung Shu Sun, both of Hsin-Chu, all of Taiwan

[73] Assignee: Dairen Chemical Corporation, Taipei, Taiwan

[21] Appl. No.: 09/151,447

[22] Filed: Sep. 11, 1998

[30] Foreign Application Priority Data

Jun. 4, 1998 [TW] Taiwan .................. 87108793

[51] Int. Cl.$^6$ .................. D02G 3/00; B28B 3/20
[52] U.S. Cl. .................. 428/364; 528/272; 528/308; 528/308.6; 264/176.1; 264/177.13
[58] Field of Search .................. 528/272, 308, 528/308.6; 264/176.1, 177.13; 428/364

[56] References Cited

U.S. PATENT DOCUMENTS

| | | | |
|---|---|---|---|
| 4,092,299 | 5/1978 | MacLean et al. | 528/289 |
| 4,144,027 | 3/1979 | Habib | 8/127.6 |
| 4,415,727 | 11/1983 | Toga et al. | 528/272 |
| 4,965,111 | 10/1990 | Pratt et al. | 428/36.8 |
| 5,552,478 | 9/1996 | Fisher | 525/41 |

*Primary Examiner*—Samuel A. Acquah

[57] ABSTRACT

This invention relates to a process for producing polyester fibers with enhanced dyeability, lesser elongation and greater strength, which comprises combining 2-methyl-1,3-propanediol into a mixture containing terephthalic acid, or an alkyl ester thereof, and a $(C_{2-6})$alkanediol, and carrying out polymerization. The resultant polyester copolymer is then spun to produce polyester fibers. This invention also relates to the polyester fibers produced by this process. These polyester fibers exhibit enhanced dyeability, lesser elongation and greater strength than un-improved polyester fibers.

14 Claims, No Drawings

PROCESS FOR PRODUCING POLYESTER FIBER HAVING IMPROVED DYEABILITY, ELONGATION AND STRENGTH, AND POLYESTER FIBER THEREFROM

FIELD OF THE INVENTION

This invention relates to a process for producing polyester fibers with enhanced dyeability, lesser elongation and greater strength, and to the polyester fibers produced by this process.

BACKGROUND OF THE INVENTION

Polyester fibers have been the most widely applicable and most productive fiber material in the textile industry. The basic procedures for the manufacture of polyesters are well known, and fibers made from polyesters can be appropriately woven or knitted to form textile fabric. Polyester fibers can be blended with other natural fibers such as wool or cotton to produce textile fibers with enhanced strength and durability. These combined fibers retain not only the physical properties of the polyesters, but also the desired qualities of the natural fibers. Such improved polyester fibers can be processed with other forms of textile fibers to produce final textile fabrics.

In addition, it is known that, if during the manufacture of these synthetic fibers, the polyesters which were initially formed as extruded linear filaments are treated and changed into other shapes, they may exhibit better properties than natural fibers such as wool and cotton. In the art, such treatments are generally referred to as texturizing (improving the texture) and may be comprised of false twisting, crimping and specific chemical treatments. While polyesters exhibit good strength characteristics in a homogeneously polymeric state, the tenacity of polyesters is a typical measurement of their strength, and is expressed as the force (grams) required to break the fabric per denier of a filament. The tenacity of an un-improved polyester filament generally ranges from about 3.5 to about 7 g/denier.

In many applications, it is desirable that the textile fabric be available in a variety of colors, these colors being realized by dyeing. However, since the un-improved polyester is not as stainable as most natural fibers, it must be dyed under the conditions of high temperature, high pressure or both, or at atmospheric conditions with or without using swelling agents, which are commonly referred to as "carriers". Accordingly, various techniques have been developed for enhancing the dyeability of the polyester.

Usually, a special dyeing technique can be employed to enhance the dyeability of polyester fibers. For example, dyestuffs are used to create physical or chemical reactions with polyesters and generally, functional groups of common dye additives are chemically reacted with dye molecules, rather than with the polyester fibers. These functional groups include carboxylic acids (particularly dicarboxylic or other multifunctional acids), organometallic sulfate or sulfonate compounds and polyethylene glycol. While Toga et. al. discloses in U.S. Pat. No. 4,415,727 the use of 2-methyl-1,3-propanediol as a crystallization-controlling agent for PET (polyethylene terephthalate) bottle molding materials, he fails to mention the function of this substance in improving the dyeability, strength and elongation of the fiber.

DETAILED DESCRIPTION OF THE INVENTION

After intensive study, the inventors have found that, since 2-methyl-1,3-propanediol has a side chain of a methyl group which renders the polyester an asymmetric chemical structure, if this compound is used as one of the components of polyester polymers, the resulting polyester polymer will be made in irregular form, and dyestuff molecules will attach to it readily. Therefore, the resulting polyesters are endowed with excellent dyeability, lesser elongation and greater strength. In this way, the present invention is disclosed.

This invention relates to a process for producing polyester fibers with enhanced dyeability, lesser elongation and greater strength, and which comprises combining 2-methyl-1,3-propanediol into a mixture containing terephthalic acid, or an alkyl ester thereof, and a ($C_{2-6}$) alkanediol, and carrying out polymerization. The resultant polyester copolymer is then spun to produce the polyester fibers of this invention.

The present invention also discloses the polyester fibers produced by the above-mentioned process, which exhibit enhanced dyeability, lesser elongation and greater strength than un-improved polyester fibers.

While the ($C_{2-6}$)alkanediol employed in the process according to this application includes ethylene glycol, propanediol, butanediol, pentanediol and hexanediol, ethylene glycol is preferred.

In the process of the present invention, the amount of 2-methyl-1,3-propanediol employed is 1 to 15 mole %—preferably 2 to 10 mole %—based on the total amount of the glycol component.

In the process of the present invention, the resulting polyesters after polymerization have an intrinsic viscosity of 0.4 to 1.5 dl/g (measured at 30° C., in a mixed solvent of phenol/tetrachloroethane with a ratio of 40/60 by weight). If the intrinsic viscosity is less than 0.4 dl/g, the fiber strength of the resulting filament will be too weak to achieve the object of this invention. On the other hand, if the intrinsic viscosity exceeds 1.5 dl/g, the molten viscosity will become too high and the spinnability, drawability and dyeability of the fiber will deteriorate.

The polymerization in the process of the present invention can be performed by either batch process or continuous process. As these reaction processes comprise steps of esterification and condensation, polyethylene terephthalates, which are commonly referred to as polyesters, are formed. Optionally, in the process of the present invention, catalysts or other additives may be added in order to promote esterification and condensation, or to render polyesters with certain specific properties. For example, antimony compounds are commonly added to catalyze the condensation reaction, and inorganic compounds such as titanium oxide are employed as delustrants or for other similar purposes.

After the polyesters are turned into viscous liquid, they are forced through a spinneret head to form individual filaments. This process is referred to as "spinning". The spinning process of the present invention can be performed by a conventional molten spinning process. The obtained spun-like filaments are drawn under conditions similar to those used to obtain conventional polyester fibers. That is, the spun-like filaments are preheated while they are passed through hot rolls and they are hot drawn at a drawn rate conforming to the speed of the take-up roll.

It should be understood that, in the field of textile manufacturing, especially the manufacture of synthetic fibers, "spinning" means the manufacture of fibers from a polymer melt, or the twisting together of natural, synthetic or blended fibers to form spun yarn.

The present invention will be further demonstrated with reference to the following Examples and Comparative Examples, but the scope of this invention is by no means limited thereto.

EXAMPLE 1

A slurry mixture comprised of mixed glycols and terephthalic acid with a molar ratio of 1.2:1 was prepared, wherein the mixed glycols were composed of ethylene glycol and 2-methyl-1,3-propanediol with a molar ratio of 97:3. This slurry mixture was subjected to esterification under pressure (absolute pressure=2 $kg/cm^2$) and at 250° C. at a conversion rate of 95% to obtain a low-polymerized product. 350 ppm of antimony trioxide was added to the product as a catalyst, and polycondensation was effected under a reduced pressure of 1 torr (absolute pressure) and at 280° C. for 3 hours to yield a polyester having an intrinsic viscosity of 0.6 dl/g. The resultant polyester was extruded through nozzles to form strands, which were then cut into cylindrical chips.

The polyester chips thus obtained or PET chips available from commercial products were dried, melted in an extruder, then extruded through a spinneret of 20 holes, where the holes had diameters of 0.25 mm, and the extruded filaments were taken up at a speed of 3,200 m/min. The obtained polyester yarn was drawn through a hot roll at 80° C. and a hot plate at 130° C. at a speed of 500 m/min to give multifilament yarns of 75 denier/40 filaments. That is, the PET filaments were homogenous polyester polymers of 1.87 dpf (denier per filament). The draw ratio was 1.7. These drawn filaments were knitted into hoselegs to perform in a dyeing test. The dyeing conditions are set forth in Table 1. The result of dyeability and tenacity thereof are shown in Table 2.

Table 1 Dyeing Conditions

Dyeing
  Dye: Sumikaron Blue E-BL (manufactured by Sumimoto Chemical Co., Ltd.). 1%
  pH regulator: acetic acid 0.7 cc/l
    ammonium acetate 1 g/l
  Dyeing time: 45 min.
  Dyeing temperature: 130° C.
  Bath ratio: 1:30
Alkali reduction cleaning
  Sodium hydroxide: 2 g/l
  Hydrosulfite: 2 g/l
  Cleaning time: 20 min.
  Cleaning temperature: 80° C.
  Bath ratio: 1:30

The spectral reflection of the hoseleg samples having been dyed under the above dyeing conditions was analyzed using an ELREPHO-2000 color analyzer (manufactured by Data Color AG, Swiss).

EXAMPLE 2

PET filaments were obtained by the same procedure as in Example 1, except that the mixed glycols in the above-mentioned slurry mixture were replaced by the mixture comprising 5 molar % of 2-methyl-1,3-propanediol and 95 molar % of ethylene glycol. The obtained polyester filaments were processed and tested as in Example 1, and the results are listed in Table 2 below.

Comparative Example 1

PET filaments were obtained by the same procedure as in Example 1, while 2-methyl-1,3-propanediol was not added. The polyester filaments were produced by a slurry mixture comprising only ethylene glycol and terephthalic acid with a molar ratio of 1.2:1. They were processed and tested as in Example 1, and the results are listed in Table 2 below.

TABLE 2

| Sample | Amount of 2-Methyl-1,3-Propanediol (mole %) | Dyeability of Hoseleg (%) | Tenacity (g/denier) |
| --- | --- | --- | --- |
| Comparative Example 1 | 0 | 100.0 | 4.8 |
| Example 1 | 3 | 126.7 | 5.56 |
| Example 2 | 5 | 119.5 | 5.06 |

In Table 2, several features of the filaments resulting from the present invention by using terephthalic acid, ethylene glycol, and 3 or 5 mole % of 2-methyl-1,3-propanediol based on total amounts of the glycol component used (as in Examples 1 and 2, respectively), are demonstrated. The only difference between Comparative Example 1 and Examples 1 and 2 is that the PET fibers in Comparative Example 1 are produced without adding 2-methyl-1,3-propanediol. For the purpose of comparison, the dyeability data shown in Table 2 are expressed based on the fact that the dyeability of the filaments in Comparative Example 1 is 100%. The values which are greater than 100% in both Examples 1 and 2 have illustrated the enhancement of the dyeability in the present invention.

The comparison of physical properties in Table 2 has shown that the dyeability of PET fibers produced in the present invention is superior to that of the un-improved PET fibers.

Elongation and Strength Test

After polyester filaments extruded through a spinneret in Example 2 and Comparative Example 1 were taken up at spinning speeds of 3,200, 3,500, 4,000 and 4,500 m/min, 4 samples of polyester filaments were then produced by the same method as in Example 1. They were then wound and 5 fiber samples of 100 m long were obtained by employing a foot pedal yarn winder. These samples were weighed, and the weights were averaged and converted into deniers. These data were input to a German made ZWIER 1511 Model strength and elongation tester. The measuring distance of fibers was 254 mm. While the stretch velocity at break in 20±1 seconds was first determined, this velocity was then employed to test on 15 samples. These results were averaged to give values of strength and elongation. The results are listed in Table 3 below.

TABLE 3

Relation ship Between Spinning Speed and Strength Elongation in PET Fibers

| Spinning Speed (m/min) | Strength of PET Fibers in Comparative Example 1 (g/dl) | Strength of PET Fibers in Example 2 (g/dl) | Elongation of PET Fibers in Comparative Example 1 (%) | Elongation of PET Fibers in Example 2 (%) |
| --- | --- | --- | --- | --- |
| 3200 | 2.33 | 2.64 | 127.3 | 113 |
| 3500 | 2.49 | 2.7 | 116.3 | 94 |
| 4000 | 2.76 | 3.17 | 97.7 | 79.8 |
| 4500 | 3.02 | 3.52 | 80.1 | 76.49 |

It is shown from the above results that the addition of 2-methyl-1,3-propanediol as one of the components of polyester fibers may improve the dyeability and strength of the polyester fibers, as well as decrease the elongation rate. The improved polyester fibers exhibit important industrial applications.

What is claimed is:

1. A process for producing polyester fibers with enhanced dyeability, lesser elongation and greater strength, which comprises combining 2-methyl-1,3-propanediol into a mixture containing terephthalic acid, or an alkyl esters thereof, and a ($C_{2-6}$)alkanediol, and carrying out polymerization, the resultant polyester copolymer being then spun to produce polyester fibers.

2. The process according to claim 1, wherein the amount of 2-methyl-1,3-propanediol employed is 1 to 15 mole %, based on the total amount of moles of the ($C_{2-6}$)alkanediol and 2-methyl-1,3-propanediol.

3. The process according to claim 2, wherein the amount of 2-methyl-1,3-propanediol employed is 2 to 10 mole %, based on the total amount of moles of the ($C_{2-6}$)alkanediol and 2-methyl-1,3-propanediol.

4. The process according to claim 1, wherein the ($C_{2-6}$) alkanediol is selected from the group consisting of ethylene glycol, propanediol, butanediol, pentanediol and hexanediol.

5. The process according to claim 1, wherein the polymerization is performed either by batch process or continuous process.

6. The process according to claim 1, wherein the alkyl ester is dimethyl terephthalate.

7. The process according to claim 4, wherein the ($C_{2-6}$) alkanediol is ethylene glycol.

8. Polyester fibers which are produced by the process according to claim 1 and have enhanced dyeability, lesser elongation and greater strength than un-improved polyester fibers.

9. Polyester fibers which are produced by the process according to claim 2 and have enhanced dyeability, lesser elongation and greater strength than un-improved polyester fibers.

10. Polyester fibers which are produced by the process according to claim 3 and have enhanced dyeability, lesser elongation and greater strength than un-improved polyester fibers.

11. Polyester fibers which are produced by the process according to claim 4 and have enhanced dyeability, lesser elongation and greater strength than un-improved polyester fibers.

12. Polyester fibers which are produced by the process according to claim 5 and have enhanced dyeability, lesser elongation and greater strength than un-improved polyester fibers.

13. Polyester fibers which are produced by the process according to claim 6 and have enhanced dyeability, lesser elongation and greater strength than un-improved polyester fibers.

14. Polyester fibers which are produced by the process according to claim 7 and have enhanced dyeability, lesser elongation and greater strength than un-improved polyester fibers.

* * * * *